US011524572B2

(12) United States Patent
Grosch et al.

(10) Patent No.: US 11,524,572 B2
(45) Date of Patent: Dec. 13, 2022

(54) PRESSURIZED GAS TANK FOR A MOTOR VEHICLE

(71) Applicant: Ford Global Technologies, LLC, Dearborn, MI (US)

(72) Inventors: Guenter Hans Grosch, Vettweiss (DE); Bert Hobein, Aachen (DE); Thomas Werner Steinkopf, Cologne (DE); Rolf Lorenz Loeffler, Rommerskirchen (DE); Julio Orozco Santos Coy, Aachen (DE); Stefan Kaimer, Aachen (DE); Florian Huth, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 17/349,491

(22) Filed: Jun. 16, 2021

(65) Prior Publication Data
US 2022/0009342 A1 Jan. 13, 2022

(30) Foreign Application Priority Data

Jul. 7, 2020 (DE) .......................... 102020117910.3

(51) Int. Cl.
| | | |
|---|---|---|
| *B60K 15/03* | (2006.01) | |
| *B60K 11/02* | (2006.01) | |
| *F17C 1/06* | (2006.01) | |
| *B60T 8/32* | (2006.01) | |
| *B60K 15/04* | (2006.01) | |

(52) U.S. Cl.
CPC ........ *B60K 15/03006* (2013.01); *B60K 11/02* (2013.01); *B60K 15/0406* (2013.01); *B60K 2015/0346* (2013.01)

(58) Field of Classification Search
CPC ...... F17C 1/16; B60K 15/03006; B60K 11/02
See application file for complete search history.

(56) References Cited

U.S. PATENT DOCUMENTS

| | | | | |
|---|---|---|---|---|
| 3,719,302 | A * | 3/1973 | Hamilton ................ | B63B 25/16 220/669 |
| 5,758,796 | A * | 6/1998 | Nishimura ................ | F17C 1/06 220/651 |
| 7,377,294 | B2 | 5/2008 | Handa | |
| 9,499,145 | B2 * | 11/2016 | Moulik .............. | B60G 17/0523 |

(Continued)

FOREIGN PATENT DOCUMENTS

| | | |
|---|---|---|
| CN | 203550678 U | 4/2014 |
| CN | 105910467 A | 8/2016 |

(Continued)

OTHER PUBLICATIONS

US 9,476,650 B2, 10/2016, Nagurny et al. (withdrawn)

*Primary Examiner* — Long T Tran
(74) *Attorney, Agent, or Firm* — Brooks Kushman PC; David Kelley

(57) ABSTRACT

A pressurized gas tank for a motor vehicle includes a cylindrical axially extending housing with two end pieces axially connected thereto connected together by one or more tie rods configured for axial transmission of tensile force. The tie rods include an axially continuous through-channel configured to be connected to a vehicle cooling system including a circulating liquid coolant to cool the pressurized gas at least during refueling of the pressurized gas tank.

20 Claims, 3 Drawing Sheets

(56) References Cited

U.S. PATENT DOCUMENTS

| | | | |
|---|---|---|---|
| 9,964,077 B2 | 5/2018 | Neal et al. | |
| 2005/0011891 A1* | 1/2005 | Austerhoff | B60K 15/03006 |
| | | | 220/4.12 |
| 2011/0226782 A1 | 9/2011 | Mueller et al. | |
| 2014/0166664 A1* | 6/2014 | Lin | F17C 1/14 |
| | | | 220/562 |
| 2014/0299215 A1* | 10/2014 | Moulik | B60C 23/16 |
| | | | 137/899.4 |
| 2021/0010640 A1* | 1/2021 | Beckner | F17C 1/06 |

FOREIGN PATENT DOCUMENTS

| | | |
|---|---|---|
| GB | 1387273 A | 3/1975 |
| JP | 2002181295 A | 6/2002 |

* cited by examiner

PRESSURIZED GAS TANK FOR A MOTOR VEHICLE

CROSS-REFERENCE TO RELATED APPLICATIONS

This application claims foreign priority benefits under 35 U.S.C. § 119(a)-(d) to DE Application 10 2020 117 910.3 filed Jul. 7, 2020, which is hereby incorporated by reference in its entirety.

TECHNICAL FIELD

This disclosure relates to a pressurized gas tank for a motor vehicle.

BACKGROUND

Pressurized gas tanks and/or pressurized containers are used in the automotive field to receive, for example, natural gas, liquefied petroleum gas or hydrogen for fuel cells. In this case the pressurized gas tank generally comprises a cylindrical central portion, bulged or dome-like end portions being adjoined thereto on the end side. Generally, a pressurized gas tank has an inner shell which is surrounded by an outer shell which consists of wound continuous fibers (rovings) in a polymer matrix. The fiber reinforcement is often included for sufficient compressive strength. Pressurized gas tanks which are exclusively manufactured from metal are known, as well as those which are manufactured from metal and exclusively fiber-reinforced in the cylindrical central portion. Other pressurized gas tanks have an inner shell made of metal and are fiber-reinforced both in the central portion and in the end portions, while others have an inner shell made of a polymer which is fiber-reinforced in the central portion and in the end portions and which has metal end pieces for a valve and/or a closure on the end side. During refueling, the pressurized gas tank heats up significantly, due mainly to the compression of the gas inside the tank (and optionally in a line leading to the tank). This may result in exceeding a designated maximum desired temperature of the tank. To manage the temperature, either the refueling has to take place more slowly or the gas has to be pre-cooled before refueling, which consumes a large amount of energy. In some cases, the refueling is interrupted automatically if the maximum temperature is reached and/or exceeded.

U.S. Pat. No. 7,377,294 B2 discloses a motor vehicle having at least one tank for receiving pressurized gas which is able to be connected by a fuel line to a high-pressure refueling line. Heat-absorbing means are provided in the tank to absorb heat during refueling, wherein the cooling action of the expanding gas in the tank is utilized when said tank is connected to the refueling line. A line is connected to the heat-absorbing means to transfer the absorbed heat to a heat-discharging device which dissipates the heat to the surroundings of the tank. According to one embodiment, the tank has two opposing end pieces, wherein a fuel line is introduced into the tank through a first end piece, is repeatedly guided between the end pieces and then exits again from the first end piece. Subsequently, the fuel line runs through a heat exchanger before it re-enters through the first end piece into the tank where it terminates in the interior thereof.

A storage container having an airtight tank made of fiber-reinforced plastics is disclosed in JP 2002-181295 A, having a first end cap which has an inlet opening for filling hydrogen into the tank and for removing hydrogen therefrom. A second end cap is configured to assist a heat transfer between the interior and the exterior of the tank, wherein external fins arranged outside the tank are thermally connected to the second end cap to improve a heat exchange with the surroundings. Moreover, internal fins are provided to assist a heat exchange between the interior of the tank and the second end cap.

US 2011/0226782 A1 discloses a pressurized gas tank for a motor vehicle, which has an inner shell with a cavity as well as an outer shell. A heat transfer element is arranged inside the cavity to provide a thermal connection between the cavity and the exterior of the cavity, wherein the heat transfer element is suitable for minimizing the action of thermal energy on the container. According to one embodiment, an adapter and a connector are arranged on opposing sides of the container, wherein both the adapter and the connector have through-passages for a heat exchange fluid which are attached to an air-conditioning system of the motor vehicle.

GB 1 387 273 A discloses a storage installation for storing material at a temperature which differs significantly from the ambient temperature. In this case, connecting elements extend inside a tank and connect opposing portions of a tank wall. The connecting elements are configured to be tubular and serve for conducting a fluid, the interior of the tank being able to be temperature-controlled thereby. The connecting elements are connected on opposing outer sides of the tank to manifolds, via which the fluid is distributed and/or collected and which are connected to a storage tank for the fluid.

In view of the disclosed prior art, the efficient configuration of the refueling process in a pressurized gas tank of a motor vehicle still leaves further room for improvement.

SUMMARY

One or more embodiments according to the disclosure permit an efficient filling of a pressurized gas tank of a motor vehicle. The features and measures set forth individually in the following description may be combined together in any technically expedient manner and reveal further embodiments of the claimed subject matter other than the combinations explicitly illustrated and described.

A pressurized gas tank for a motor vehicle such as a passenger motor vehicle or truck may be embodied as, among other things, a liquefied gas tank and normally serves to receive a pressurized fuel that serves for driving or propelling the motor vehicle. Representative fuels may include liquid or gaseous hydrogen for a fuel cell, liquid or gaseous natural gas (compressed natural gas, CNG), dimethyl ether (DME), or even liquefied petroleum gas (LPG, normally a mixture of butane and propane) for a correspondingly designed internal combustion engine. In the operating state, the gas is in some circumstances entirely or partially present in a liquefied state inside the pressurized gas tank due to the high pressure. Nevertheless, for simplicity "gas" is referred to herein, since even in these cases this corresponds to the aggregate state under normal operating conditions when where the fuel is combusted to provide propulsive energy to the vehicle.

In one or more embodiments, a pressurized gas tank has an axially extending housing which has a tangentially circulating central portion as well as two end pieces which are axially connected thereto on the end side and which are connected together by at least one tie rod for the axial transmission of tensile force. The housing described herein, therefore, has at least three parts and/or portions, namely the central portion and the two end pieces. These components may be manufactured individually and connected together. It might also be conceivable, however, that at least one part of the central portion is manufactured integrally with at least one end piece, for example by means of additive manufacturing. In this regard, it is also possible to refer to an end portion rather than an end piece. The housing extends in a direction which is defined herein as axial and which normally corresponds to a housing axis which in turn forms an axis of symmetry of the housing. Relative to the axial direction the central portion is configured to circulate tangentially, i.e. it surrounds the housing axis in the manner of a cylinder lateral surface. Normally the cross section of the central portion is configured to be circular and at least approximately uniform in the axial direction. In each case, an end piece is connected to the central portion at the axially opposing ends of the central portion, said connection being able to be implemented, in addition to the above-mentioned integral manufacture of the end piece with the central portion, by different positive, non-positive and/or material connections, for example by cooperating threads, a double socket, casting, pressing-over, a crimped connection, etc. The shape of the respective end piece may be bulged in a convex or concave manner at least in some sections. Regarding the materials, there are no limitations within the scope of the claimed subject matter. Normally the end pieces consist of metal, for example aluminum. The central portion may consist, for example, of a polymer or also of a metal. The end pieces and the central portion surround an interior of the pressurized gas tank which in the operating state is filled with the gas. The housing parts described herein may form, in particular, an inner shell or liner of the housing, bundles of continuous fibers (so-called rovings), for example carbon fibers, glass fibers, aramid fibers, etc. or even mixtures of different fibers, being entirely or partially wound around the outside of said inner shell or liner and in turn being bonded into a polymer matrix. In particular, the compressive strength of the tank may be improved by means of this fiber reinforcement.

The two end pieces are connected together by at least one tie rod for the axial transmission of tensile force. The respective tie rod, which may also be denoted as a pull rod in some embodiments, is arranged in the interior of the pressurized gas tank. The tie rod connects the two end pieces together such that tensile forces may be transmitted in the axial direction between the two end pieces. In this case, a force which pulls apart the two end pieces in the axial direction is denoted as a tensile force. Such a force is produced, in particular in the filled state of the pressurized gas tank, by the internal pressure of the contained gas (optionally at least partially liquefied). The at least one tie rod serves, therefore, to improve the compressive strength and stability of the pressurized gas tank. This is advantageous since the forces acting in the axial direction on the respective end piece do not have to be absorbed, or only to a lower level, by the central portion and/or by the rovings which are wound around the end piece. The respective tie rod may be manufactured from metal, such as for example steel or aluminum, but possibly also from ceramics or fiber-composite material to have the desired tensile strength. Normally the orientation of the at least one tie rod corresponds approximately to the axial direction, i.e. it is preferred that at least one tie rod runs continuously at an angle of less than 20°, preferably less than 10°, to the axial direction. In particular, the respective tie rod may run parallel to the axial direction.

According to one or more embodiments, at least one tie rod has an axially continuous through-channel which is connected at least indirectly to two coolant connectors, each thereof being arranged on an end piece and being configured so as to be connected to a coolant circuit. The respective tie rod has a through-channel which is configured to be axially continuous. It could also be said that the through-channel is configured continuously along the entire tie rod, which thus may be denoted as hollow or at least in the broadest sense as tubular. The (at least one) through-channel is directly or indirectly connected (via an intermediate further channel, a further line or another recess) to two coolant connectors. In this case naturally the one end of the through-channel is (directly or indirectly) connected to the one coolant connector, and the other end is connected to the other coolant connector. Each of the coolant connectors is configured on an end piece. In the installed state of the pressurized gas tank, the coolant connectors are configured and/or designed to be connected to a coolant circuit. In other words, in the installed state the pressurized gas tank is incorporated in the coolant circuit, wherein the coolant flows in through one of the coolant connectors (which may also be denoted as the inlet coolant connector) and flows out again through the other coolant connector (which may also be denoted as the outlet coolant connector). In this case, due to the connection of the through-channel to the coolant connectors set forth above, the coolant may also be conducted through the through-channel.

Since the through-channel is configured in the interior of the tie rod, which in turn runs through the interior of the pressurized gas tank, a heat exchange may take place between the coolant in the through-channel and the gas in the interior of the pressurized gas tank. This is advantageous, in particular, when refueling the pressurized gas tank, where said pressurized gas tank could heat up significantly, mainly due to the compression of the gas. Since, however, at least one part of the heat generated by compression may be discharged to the coolant, the heating up of the pressurized gas tank is reduced, so that the tank temperature may be managed more easily and maintained below a maximum specified temperature. This in turn has the advantage that the refueling may be carried out more rapidly without it being necessary to pre-cool the gas. According to one embodiment, the coolant circuit is a coolant circuit of the motor vehicle. In this case the coolant may be a conventional liquid coolant of the motor vehicle, for example a water-glycol mixture. This may also be used for the cooling and/or the temperature-control of other components of the vehicle. The heat which is transmitted from the compressed gas to the coolant may be discharged at a different location via a radiator outwardly to the surroundings of the vehicle or alternatively also used for heating the vehicle interior. Optionally it may be provided that the pressurized gas tank is arranged in a branching of the cooling circuit which optionally may be shut off when no cooling or other temperature control is required. Alternatively an at least partially external coolant circuit could also be used, for example a coolant circuit of a refueling station for the pressurized gas tank. Such a refueling station is generally provided as standard with a coolant circuit, which conducts a coolant which is generally substantially cooler than the coolant of the motor vehicle. In this regard, this coolant is more effective. However, in this case additional means have to be provided both via the motor vehicle and via the fuel station for the transfer of the coolant which is why this variant may be more costly to implement.

It is particularly advantageous in the solution of the claimed subject matter that a single component, namely the tie rod, undertakes two functions, namely on the one hand the mechanical stabilizing of the pressurized gas tank and on the other hand the conductance of the coolant. Thus, it is possible to make savings in material and construction space. It is also regarded as advantageous that the cooling of the gas is able to take place via a cooling circuit of the motor vehicle, which is present in any case for the temperature-control of other vehicle components and into which the pressurized gas tank is simply incorporated.

The external cross section of a tie rod may be configured in various ways, for example polygonal, rectangular, oval or, in particular, circular. The same applies to the cross section of the through-channel which may also be configured to be, in particular, circular. Within the context of the invention it is possible that a tie rod has a plurality of through-channels, but normally each tie rod has just one through-channel.

Normally the pressurized gas tank has a plurality of tie rods which are spaced apart from one another in pairs and which have in each case one through-channel. In other words, each of the tie rods has a through-channel, whereby as a whole the cross-sectional area available for the coolant transfer is increased and/or distributed to a plurality of tie rods. The tie rods are spaced apart from one another in pairs, i.e. each of the tie rods is spaced apart from the other tie rods and not in contact therewith. Thus in comparison with a single tie rod, which has a cross-sectional area which is comparable to the plurality of tie rods as a whole, this produces a larger outer surface and/or lateral surface, via which the heat exchange between the coolant and the gas filled under pressure may take place. Apart from this, the use of a plurality of tie rods may also have mechanical advantages, for example in terms of the absorption of tensile forces acting between the end pieces.

The number of tie rods may vary within the scope of the invention, wherein specific upper and lower limits may still be regarded as advantageous. With a very high number of entry points, the effectively usable interior of the gas tank may be reduced to an undesired level. Conversely, with a small number of tie rods an effective and/or balanced absorption of tensile forces between the end pieces may be difficult to ensure. In various embodiments, the pressurized gas tank has between 4 and 20 tie rods which have in each case one through-channel. The number of tie rods may be between 6 and 15 tie rods.

In particular, when a plurality of tie rods are provided in each case with a through-channel, it might be possible, for example, that the coolant flow enters into a through-channel via the end piece, is conducted to the opposing end piece, and with a reversal of the movement is conducted back again to the first end piece through a different through-channel, where it exits again from the first end piece. In this case, the two coolant connectors might be arranged on the first end piece, which may be advantageous, among other things, in the case of limited available constructional space, since in this case the coolant lines which are connected to the two coolant connectors are arranged on one side of the pressurized gas tank. According to a further embodiment, the first end piece has an inlet coolant connector and a second end piece has an outlet coolant connector. The inlet coolant connector is provided according to requirements, such that in the operating state the coolant flow enters through said inlet coolant connector, while the coolant flow exits again through the outlet coolant connector. Although in this embodiment it might also be conceivable that the coolant flow is conducted to a certain extent according to a reciprocal movement in different through-channels, on the one hand from the first to the second end piece and on the other hand from the second to the first end piece, it is preferred if the pressurized gas tank is configured to conduct the coolant flow in all of the through-channels from the first to the second end piece. As a result, in contrast to a reciprocal movement, the duration of the heat exchange between a specific volume element of the coolant flow and the gas in the interior of the pressurized gas tank may be shortened. This in turn leads to the coolant flow being heated up less when passing through the through-channels and thus the temperature difference being greater relative to the surrounding gas. This in turn ensures a higher temperature gradient within the wall of the respective tie rod, whereby the cooling of the gas is improved.

According to one embodiment, a plurality of tie rods are radially spaced apart from an axial housing axis and are arranged offset tangentially to one another. As already described above, the housing axis typically forms an axis of symmetry of the entire pressurized gas tank and/or the majority of the components thereof. The housing axis runs in the axial direction. In the case of the embodiments described herein, a plurality of tie rods, optionally all of the tie rods, are arranged spaced apart from the housing axis. In particular, the tie rods may have the same (radial) spacing from the housing axis. However, the tie rods are arranged tangentially offset to one another. If the tie rods have the same radial spacing from the housing axis, they are spaced apart tangentially from one another.

To assist a coolant flow which is as uniform as possible into the through-channels and/or out of the through-channels, at least one end piece may have a collection channel which connects a coolant connector to a plurality of through-channels. In other words, coolant does not pass from the coolant connector directly into the respective through-channels of the tie rods but initially into a collection channel which is configured on an end piece and/or preferably inside an end piece. In the region of the inlet coolant connector the collection channel could also be denoted as the distribution channel. According to one embodiment, the respective collection channel connects a coolant connector to all of the through-channels.

In one embodiment at least one collection channel is of annular configuration. This may be combined, in particular, with the aforementioned embodiment in which a plurality of tie rods are radially spaced apart from the housing axis and offset tangentially thereto. In this case, the radial position of the annular collection channel may coincide with the radial position of the respective through-channels. Normally, the annular collection channel is configured to be circular-symmetrical and centered around the housing axis.

According to an advantageous embodiment, at least one end piece has a through-opening which runs axially and which is surrounded by the collection channel. The corresponding through-opening passes from the outer face of the tank to the inner face, i.e. toward the interior which is able to be filled with gas. In the mounted state, for example, a valve or even a closure piece may be arranged therein. The refueling of the pressurized gas tank takes place via such a valve. Apart from the symmetrical and thus generally stable arrangement, this embodiment has further advantages, in particular when it is combined with the above-described arrangement of a plurality of tangentially offset tie rods, starting from the collection channel. In this case, during refueling the gas flows through the through-opening and/or through a valve arranged therein into the interior and initially passes into a region in the vicinity of the housing axis about which the tie rods are arranged with the through-channels. In other words, in order to pass into the regions of the interior which are further spaced apart from the housing axis, the gas has to flow through between the tie rods, whereby a particularly effective heat exchange is possible with the coolant.

As already set forth, the collection channel may be configured inside the end piece. For example, in the case of an annular collection channel, therefore, an internal annular recess is configured inside the end piece. This may be implemented either by the end piece being made up of (for example two) individual parts, the collection channel being formed therebetween. However, at least one end piece may be manufactured integrally together with the collection channel. This may be carried out, in particular, by an additive manufacturing method, for example a powder bed method such as selective laser melting or selective electron beam melting or even by a casting method such as for example a lost wax casting method. Receiving openings may be manufactured at the same time as the collection channel, in the assembled state the ends of the tie rods being received therein.

In principle, the cross section of the collection channel may be designed differently inside the radial-axial plane. In particular, the cross section may be, for example, circular, oval, differently rounded or even polygonal, for example rectangular. So as not to impede the supply line to the individual through-channels and, in particular, not to permit any greater pressure differences to be produced at the individual through-channels, it is preferred if the cross section of the collection channel is larger in the radial-axial plane than the cross section of an individual through-channel in the radial-tangential plane. Moreover, it is preferred that a cross section of the collection channel has a greater extent in the axial direction than in the radial direction. This refers to the cross-sectional area on one side of the housing axis, i.e. the entire radial extent of the cross-sectional area on both sides of the housing axis is not considered. It may be said that the collection channel in this embodiment corresponds to a torus extended in the axial direction (and/or a torus compressed in the radial direction). Moreover, the cross section may be widened in the flow direction in order to achieve a uniform flow rate.

Further advantageous details and effects of the invention are described in more detail hereinafter with reference to an exemplary embodiment shown in the figures, in which:

DETAILED DESCRIPTION

Figure 1:
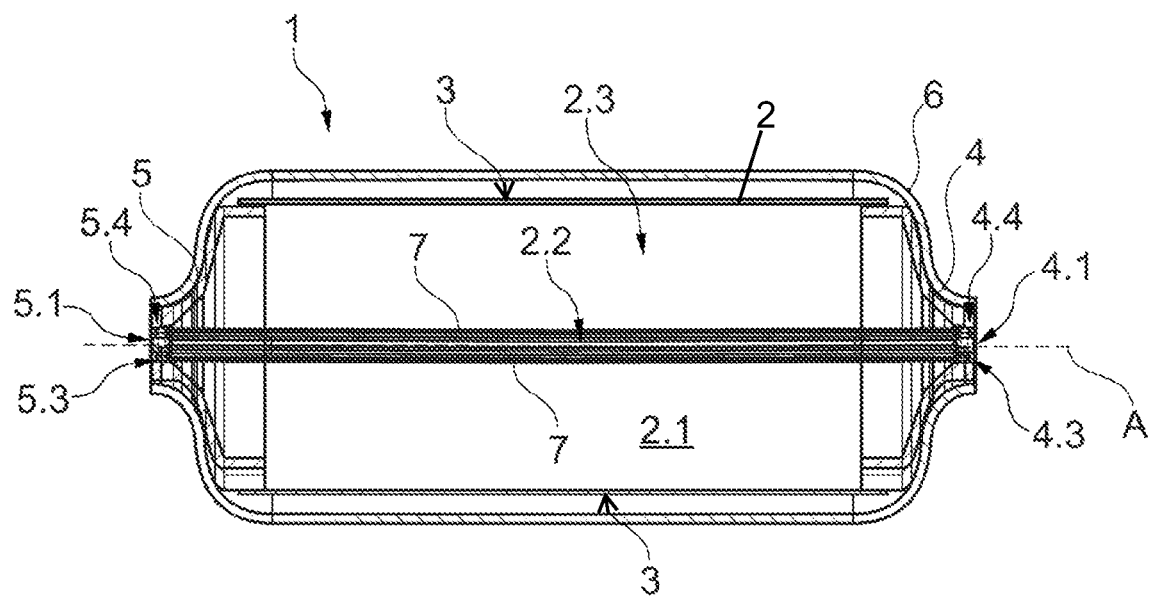
FIG. 1 shows a first sectional view of a representative embodiment of a pressurized gas tank.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the various figures, parts which are the same are provided with the same reference numerals which is why generally these parts are only described once.

Figure 4:
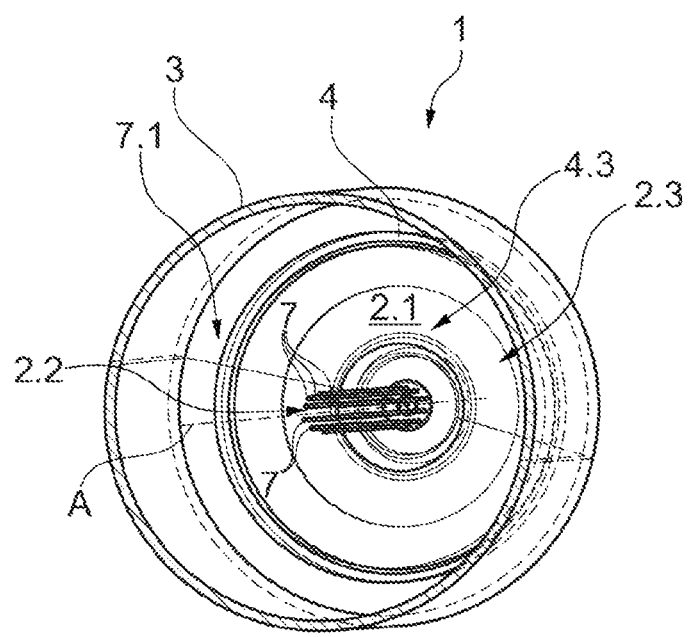
FIG. 4 shows a fourth sectional view of the pressurized gas tank of FIGS. 1.
Figure 5:
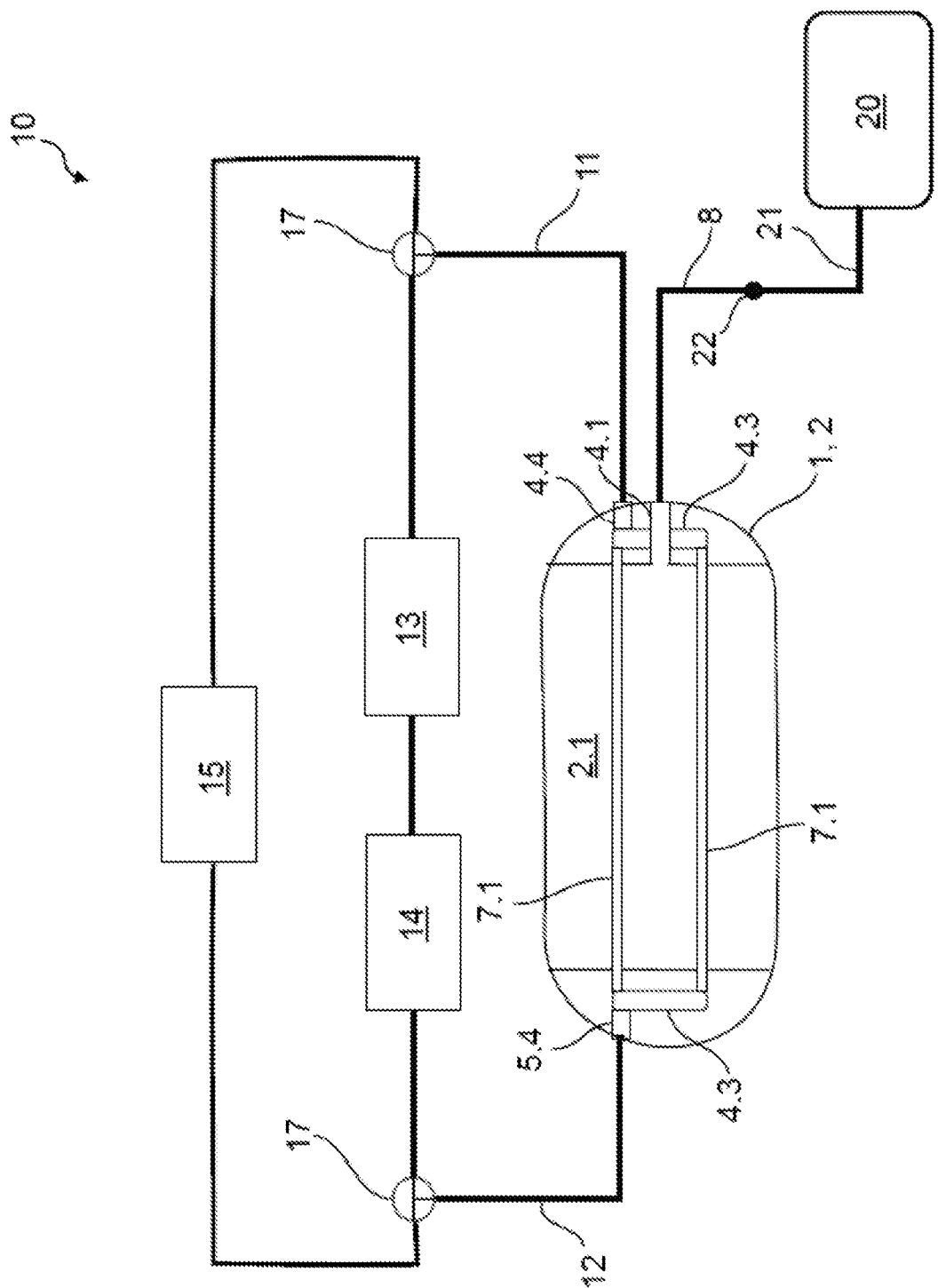
FIG. 5 shows a schematic view of a cooling circuit having a pressurized gas tank connected to an external supply tank during refueling.

FIGS. 1-4 show sectional views of a representative embodiment of a pressurized gas tank 1 according to the disclosure for a motor vehicle which may be used, for example, in a passenger motor vehicle. FIG. 5 illustrates a representative vehicle system 10 including a pressurized gas tank 1 coupled to an external supply tank 20 during refueling.

With reference to FIGS. 1-5, the cutting plane in FIG. 1 runs parallel to a housing axis A which corresponds to an axial direction. The housing axis A forms an axis of symmetry of the pressurized gas tank 1. This pressurized gas tank has a housing 2 with a central portion 3 having the shape of a cylinder lateral surface, a first end piece 4 and a second end piece 5 being adjoined thereto axially on the end side. The central portion 3 may be manufactured, for example, from polymer or metal, and the end pieces 4, 5 are manufactured from metal, for example aluminum. Both the central portion 3 and the end pieces 4, 5 form an inner shell of the housing 2 which is surrounded by an outer shell 6 which consists of wound rovings (endless fibers) in a polymer matrix. Each of the end pieces 4, 5 has an axially running through-opening 4.1, 5.1 in the region of the housing axis A. In the assembled state a valve, not shown here, is inserted in the through-opening 4.1 of the first end piece 4, while a closure piece is inserted in the through-opening 5.1 of the second end piece 5. Via the aforementioned valve, an interior 2.1 of the housing 2 may be filled with a pressurized gas (for example hydrogen, liquefied petroleum gas, natural gas or DME) which serves for driving the motor vehicle.

The two end pieces 4, 5 are connected by a plurality of tubular tie rods 7 which run parallel to the housing axis A. In the present example, the tie rods 7 are formed from the same material (for example aluminum) as the end pieces 4, 5. The ends of each tie rod 7 are received in a recess 4.2, 5.2 (FIG. 2) of the respective end piece 4, 5 provided therefor, wherein for example they may be screwed therein, soldered or welded. In any case, as a result a tensile force-transmitting connection is provided in the axial direction between the two end pieces 4, 5. In other words, a tensile force acting axially between the end pieces 4, 5 (which is oriented to pull apart the end pieces 4, 5 in the axial direction) is at least partially absorbed by the tie rods 7. As a result, both the connection between the end pieces 4, 5 and the central portion 3 and the outer shell 6 are mechanically relieved of load.

Tie rods 7 which are arranged at the same radial spacing from the housing axis A are provided, wherein two adjacent tie rods 7 are offset to one another in the circumferential direction, in each case by 36°. Each tie rod 7 has a circular outer cross section and is passed through by a through-channel 7.1 which is also configured to be circular. Via the first end piece 4 the through-channels 7.1 are connected to an annular first collection channel (which may also be referred to as a distribution channel, distributor, plenum, or manifold) 4.3 and via the second end piece 5 to a similarly annular second collection channel 5.3.

Figure 2:
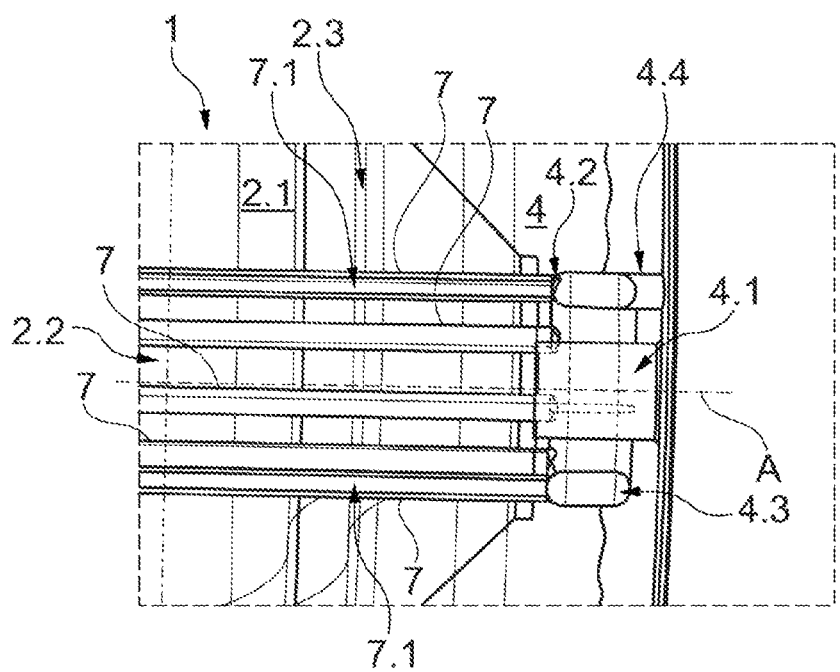
FIG. 2 shows a second sectional view of the pressurized gas tank of FIG. 1.
Figure 3:
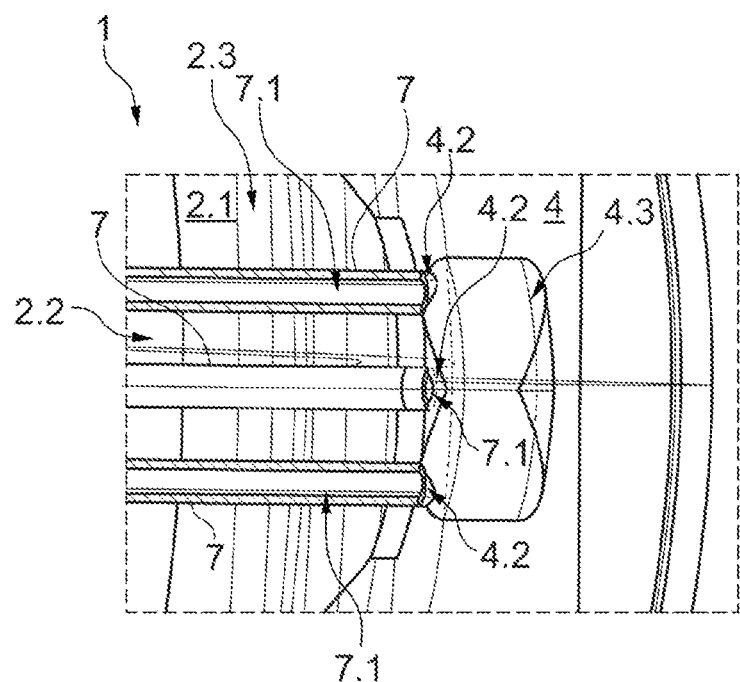
FIG. 3 shows a third sectional view of the pressurized gas tank of FIG. 1.

As may be identified, in particular, in the sectional view in FIG. 2, each of the collection caps 4.3, 5.3 surround the through-opening 4.1, 5.1 of the respective end piece 4, 5 in an annular manner and include a an annular collection channel having an input that connects the through channels to a central output channel configured for coupling to coolant line 11 of the vehicle cooling circuit. The cross section thereof in the axial radial plane (which forms the cutting plane in FIG. 2) has a larger dimension in the axial direction than in the radial direction. The first collection channel 4.3 is connected to an inlet coolant connector 4.4, whilst the second collection channel 5.3 is connected to an outlet coolant connector 5.4. The respective end piece 4, 5 is manufactured integrally together with the collection channel 4.3, 5.3 and the coolant connector 4.4, 5.4, for example by additive manufacturing or by a suitable casting method such as a lost wax casting method.

In the installed state, the inlet coolant connector 4.4 is connected to a first line 11 of a coolant circuit 10 of the motor vehicle, as shown schematically in FIG. 5, whilst the outlet coolant connector 5.4 is connected to a second line 12. The coolant circuit 10 conducts a liquid coolant, for example a water-glycol mixture and serves for the temperature control, i.e. the cooling and/or heating, of different vehicle components or regions. Apart from the pressurized gas tank 1, further vehicle components 13, 14 (for example an engine, a gearbox or the like) which are intended to be cooled, may also be incorporated in the coolant circuit 10, as well as a heat exchanger 15, via which heat may be discharged from the coolant either to the surroundings of the motor vehicle or to a vehicle interior in order to heat said vehicle interior. It goes without saying that the coolant circuit 10 is shown highly simplified in FIG. 5 and normally has further components and lines.

When the motor vehicle is refueled, pressurized gas, which may also be present entirely or partially in liquefied form, is conducted from an external tank 20 via a tank line 21 to the motor vehicle. The tank line 21 is coupled in a gastight manner via a coupling system 22, not shown here in detail, to a supply line 8 which is arranged inside the motor vehicle and which in turn is connected via the aforementioned valve to the pressurized gas tank 1. When the gas flows into the pressurized gas tank 1 it passes initially into an internal region 2.2 (FIG. 4) between the tie rods 7, from where it may pass further into an outer region 2.3 (FIG. 4). At the same time, the gas flows through the intermediate spaces between the tie rods 7 and is in contact with the tie rods 7 over a relatively large surface area. This results in a heat exchange between the gas, which heats up when filled in, and the cool liquid in the through-channels 7.1. The heating up of the gas is limited by the heat exchange with the cool liquid, provided via the wall of the respective tie rod 7. As a result, even in the case of relatively rapid refueling it is possible to prevent the temperature of the gas and/or the pressurized gas tank 1 from exceeding a predetermined threshold value. An external pre-cooling of the gas is not necessary therefor. The heat absorbed by the cool liquid is dissipated via the coolant circuit 10 and may be discharged, for example, via the heat exchanger 15 to a vehicle interior or even to the vehicle surroundings. Optionally, the part of the cooling circuit 10 comprising the first and second line 11, 12 may be shut off via valves 16, for example when it is not necessary to cool the gas and/or the pressurized gas tank 1.

Alternatively, the pressurized gas tank shown in FIGS. 1-4 may also be used in combination with a coolant circuit, in some cases at the fuel station, which also comprises the external tank 20 and the tank line 21. In this variant, not shown, further lines are required both via the fuel station and via the motor vehicle, in addition to a further coupling system, to transfer the external coolant of the fuel station. An advantage in this variant is that the fuel station is generally able to provide a coolant of substantially lower temperature, which thus cools the gas more effectively.

While exemplary embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that are not explicitly illustrated or described.

What is claimed is:

1. A vehicle comprising:
    a cooling circuit configured to circulate liquid coolant through a heat exchanger; and
    a pressurized gas tank comprising:
        an axially extending cylindrical housing including end pieces connected thereto; and
        a plurality of tie rods extending between the end pieces within the cylindrical housing and configured to transmit tensile force exerted by pressurized gas within the tank, each of the plurality of tie rods including a through channel coupled to the cooling circuit.

2. The vehicle of claim 1 wherein the plurality of tie rods are circumferentially positioned around a central axis of the pressurize gas tank.

3. The vehicle of claim 2 wherein at least one of the end pieces of the pressurized gas tank includes a gas port positioned along the central axis of the pressurized gas tank.

4. The vehicle of claim 3 wherein the pressurized gas tank further comprises an outer shell surrounding the cylindrical housing and the end pieces.

5. The vehicle of claim 4 wherein the outer shell comprises wound rovings within a polymer matrix.

6. The vehicle of claim 4 wherein the pressurized gas tank further comprises at least one collection cap having an annular channel coupling the through channel of each of the tie rods to an outlet of the collection cap coupled to the cooling circuit.

7. The vehicle of claim 4 wherein ends of each of the tie rods are secured to a respective one of the end pieces.

8. The vehicle of claim 7 wherein the ends of each of the tie rods are welded or soldered to the respective end piece.

9. The vehicle of claim 4 wherein coolant from the cooling circuit flows through the through channels of the tie rods in only one direction.

10. A pressurized gas tank for a vehicle, the gas tank comprising:
    an axially extending cylindrical housing having end pieces connected thereto; and
    at least one tie rod extending between the end pieces within the cylindrical housing and configured to transmit tensile force exerted by pressurized gas within the tank, wherein the at least one tie rod defines an axially continuous through-channel coupled to an inlet coolant connector at one end and an outlet coolant connector at an opposite end.

11. The pressurized gas tank of claim 10 wherein the at least one tie rod comprises a plurality of tie rods circumferentially positioned around a central axis of the pressurized gas tank.

12. The pressurized gas tank of claim 11 further comprising a gas port configured to receive or dispense pressurized gas, the gas port disposed along the central axis of the pressurized gas tank.

13. The pressurized gas tank of claim 12 further comprising a collection cap having an annular channel coupled to one end of the through channels of the tie rods, the annular channel connected to an outlet configured for connection to a cooling system of the vehicle.

14. The pressurized gas tank of claim 13 wherein the tie rods are welded or soldered to the end pieces.

15. The pressurized gas tank of claim 14 further comprising an outer shell surrounding the housing and the end pieces.

16. The pressurized gas tank of claim 15 wherein the outer shell comprises wound rovings of fibers within a polymer matrix.

17. The pressurized gas tank of claim 15 wherein the tie rods are equally circumferentially spaced about the central axis.

18. A system comprising:
   a cooling circuit configured to circulate liquid coolant through a heat exchanger; and
   a pressurized gas tank comprising:
      a cylindrical housing including end pieces connected thereto, at least one of the endpieces defining a gas port configured to receive and dispense pressurized gas;
      a plurality of tie rods extending between the end pieces within the cylindrical housing and arranged in a circumferential manner about the gas port, the tie rods welded or soldered to the end pieces and configured to transmit tensile force exerted by pressurized gas within the tank, each of the tie rods including a through channel coupled to the cooling circuit;
      an end cap associated with each end of the tie rods, each end cap defining an annular channel coupling ends of the through channels of the tie rods to a coolant port coupled to the cooling circuit.

19. The system of claim 18 wherein the pressurized gas tank further comprises a shell surrounding the housing and end pieces, the shell comprising wound rovings of fibers within a polymer matrix.

20. The system of claim 19 wherein the cooling circuit comprises a vehicle cooling circuit configured to circulate a liquid coolant through the tie rods in only one direction.

* * * * *